United States Patent
Gu et al.

(10) Patent No.: US 10,983,007 B2
(45) Date of Patent: Apr. 20, 2021

(54) MATERIAL OPTICAL TRANSITION ANALYSIS METHOD AND SYSTEM

(71) Applicant: HUAZHONG UNIVERSITY OF SCIENCE AND TECHNOLOGY, Hubei (CN)

(72) Inventors: Honggang Gu, Hubei (CN); Baokun Song, Hubei (CN); Shiyuan Liu, Hubei (CN); Mingsheng Fang, Hubei (CN); Xiuguo Chen, Hubei (CN); Hao Jiang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 4 days.

(21) Appl. No.: 16/521,603

(22) Filed: Jul. 25, 2019

(65) Prior Publication Data
US 2020/0333188 A1    Oct. 22, 2020

(30) Foreign Application Priority Data
Apr. 16, 2019   (CN) .......................... 201910301515.8

(51) Int. Cl.
*G01J 3/443*     (2006.01)
*G01N 21/63*    (2006.01)

(52) U.S. Cl.
CPC .............. *G01J 3/443* (2013.01); *G01N 21/63* (2013.01)

(58) Field of Classification Search
CPC ..................................................... G01J 3/443
(Continued)

(56) References Cited

U.S. PATENT DOCUMENTS

| | | | | |
|---|---|---|---|---|
| 4,400,451 A | * | 8/1983 | Gordon | H01G 9/20 429/111 |
| 2004/0068163 A1 | * | 4/2004 | Ruchti | A61B 5/14532 600/316 |
| 2010/0224873 A1 | * | 9/2010 | Sakata | H01L 29/78696 257/43 |

OTHER PUBLICATIONS

Wei Li, "Broadband optical properties of large-area monolayer CVD molybdenum disulfide", Physical Review B, Nov. 21, 2014, pp. 1-8.
(Continued)

*Primary Examiner* — Tarifur R Chowdhury
*Assistant Examiner* — Omar H Nixon
(74) *Attorney, Agent, or Firm* — JCIPRNET

(57) ABSTRACT

A material optical transition analysis method and system are provided, the method includes: determining a dielectric function spectrum of a material to be analyzed, calculating a second derivative spectrum of the dielectric function spectrum related to the excitation light energy, and performing the CP fitting analysis on the second derivative spectrum to obtain a CP analysis result diagram of the material; drawing an energy band structure diagram and a PDOS diagram of the material, and drawing an energy difference diagram between CBs and VBs according to the energy band structure diagram of the material; determining spatial positions of CPs and the corresponding CBs and the VBs according to the CP analysis result diagram of the material and the energy difference diagram between the CBs and the VBs; and finally indicating the CBs and the VBs in the energy band structure diagram, and determining the particle types participating in formation of the CPs in the PDOS diagram to complete the material optical transition analysis. The invention realizes the analysis and interpretation of the optical transition characteristics occurring at the materials from the perspective of physics, which has the advantages of
(Continued)

reliable operation process system and accurate and reliable analysis results.

3 Claims, 5 Drawing Sheets

(58) Field of Classification Search
USPC .......................................................... 356/300
See application file for complete search history.

(56) References Cited

OTHER PUBLICATIONS

Aurélien M. A. Leguy, "Experimental and theoretical optical properties of methylammonium lead halide perovskites", Nanoscale, Aug. 2016, pp. 6317-6327.

Masaki Shirayama, "Optical transitions in hybrid perovskite solar cells: Ellipsometry, density functional theory, and quantum efficiency analyses for CH3NH3PbI3", Physical Review Applied, Jan. 27, 2016, pp. 1-25.

* cited by examiner

MATERIAL OPTICAL TRANSITION ANALYSIS METHOD AND SYSTEM

CROSS-REFERENCE TO RELATED APPLICATION

This application claims the priority benefits of China application serial no. 201910301515.8, filed on Apr. 16, 2019. The entirety of the above-mentioned patent application is hereby incorporated by reference herein and made a part of specification.

BACKGROUND

Technical Field

The invention relates to a material measurement and characterization research field, and particularly relates to a material optical transition analysis method and system, which are adapted to analysis and research of optical transitions of various materials.

Description of Related Art

Along with advent of an information age in the $21^{st}$ century, optical properties of materials have attracted great attention. Especially the discovery of graphene in 2004 triggered extensive research on low-dimensional material science by researchers, after which a large number of miniaturized and quantized optical devices were designed and manufactured. However, performance of these optical devices largely depends on intrinsic optical properties of the related materials, especially microscopic optical transition properties of the materials. Therefore, accurate analysis and research of material optical transitions are very important for the design and optimization of the corresponding optical devices.

Main parameters for quantitatively describing a material optical property include: the dielectric function, the complex refractive index and the complex optical conductivity, and these three parameters can be deduced from each other under certain conditions. It can be said that these three basic optical parameters can directly influence the working performance of corresponding optical devices (such as: photodetectors, field effect transistors, solar cells, sensors, etc.). Presently, measurement and characterization of these basic optical parameters mainly include three methods of reflection (absorption) spectroscopy, contrast spectroscopy and ellipsometry. Although the methods used to determine the basic optical parameters are relatively mature, the in-depth analysis of optical transition characteristics implied in the basic optical parameters is still insufficient after the basic optical parameters are obtained. There is no systematic method or process for analyzing the material optical transition characteristics at present, which also limits an in-depth optimization design of the corresponding optical devices.

With the aid of first-principles calculations based on the density functional theory, scientists can substantially predict the dispersion rule of the dielectric function or the complex refractive index of materials, and qualitatively explain the underlying physical mechanisms of the optical transitions. In recent years, along with the disclosure and development of some hybrid functionals, the reliability of the material basic optical parameter spectrum obtained through theoretical calculation is further improved, but there are still problems such as insufficient strength and feature mismatch, etc., which makes theoretical analysis of the material optical transition still having greater uncertainty, this is mainly because that the proposed hybrid functionals cannot accurately describe internal exchange-correlation potential in the materials. At present, the widely accepted GW-BSE (Bethe-Salpeter Equation) theory which can accurately predict the material basic optical parameter spectrum requires very expensive computational resources to obtain relatively reliable optical parameter spectrum. For the materials with a large number of atoms in primitive cells, the optical parameter prediction based on the GW-BSE theory is also becoming impractical at present. Therefore, in most cases, it is unrealistic to analyze the optical transition mechanisms of the materials by directly comparing the material optical parameter spectrum measured through experiment with the theoretically calculated optical parameter spectrum. In order to avoid such difficulty, scientists have found that the calculated energy band structure and the Partial Density of States (PDOS) of the material can reflect the optical transition information of the material to some extent. Compared with the direct calculation of the optical parameter spectrum of the material, the calculation of the energy band structure and the PDOS is much easier and has high accuracy. At present, some research groups measure optical parameter spectrum of materials from the perspectives of theory and experiment and analyze the optical transitions of the materials, for example, Li et al., of Peking university (Broadband optical properties of large-area monolayer CVD molybdenum disulfide, Physical Review B, 2014, 90: 195434) measured dielectric function spectrum of monolayer molybdenum disulfide ($MoS_2$) by means of a spectroscopic ellipsometer, and combined with a critical point (CP) analysis theory, they determined and explained some CPs on the dielectric function spectrum, and theoretically speculated the corresponding optical transition mechanism of these CPs. However, a reliable theoretical basis and a detailed analysis flow of the inference are not given, and the energy band structure and the PDOS are not introduced to further describe the optical transition details of the CPs in the dielectric function spectrum. Leguy et al. (Experimental and theoretical optical properties of methylammonium lead halide perovskites, Nanoscale, 2016, 8: 6317-6327) used ellipsometry to obtain a dielectric function spectrum of lead-based perovskite, and obtained the energy band structure of the lead-based perovskite through first-principles calculations, and finally determined optical transition types corresponding to some CPs in the dielectric function spectrum of the lead-based perovskite by introducing an energy band nesting theory. Such method is more systematic, but a more reliable method for the center energy identification of the CPs is not provided. Shirayama et al. (Optical Transitions in Hybrid Perovskite Solar Cells: Ellipsometry, Density Functional Theory and Quantum Efficiency Analyses for $CH_3NH_3PbI_3$, Physical Review Applied, 2016, 5: 014012) studied transition properties of organic-inorganic hybrid perovskites by means of first-principles calculations and ellipsometry, and introduced a CP analysis theory. However, these theories are not organically combined with the experimental results, and the explanation for the optical transitions corresponding to the CPs is mainly based on the theoretical calculation results.

SUMMARY

In view of the above shortcomings or improvement requirements of the prior art, the invention provides a material optical transition analysis method and system, which use a material dielectric function spectrum, a CP theory, an energy band structure diagram, a PDOS diagram and an energy difference diagram of conduction bands (CBs) and valence bands (VBs) to perform analysis and interpretation on material optical transition in a physical level, so as to obtain a specific position of the optical transition, a relevant energy level and a related particle type, etc., and realize analysis and interpretation of the optical transition characteristics of the material in the physical level, which has the advantages of reliable operation process system and accurate and reliable analysis results.

In order to achieve the above purpose, according to one aspect of the invention, a material optical transition analysis method is proposed, which includes the following steps:

S1: determining a dielectric function spectrum of a material to be analyzed, calculating a second derivative spectrum of the dielectric function spectrum with respect to excitation light energy, and performing a CP fitting analysis on the second derivative spectrum to obtain a CP analysis result diagram of the material;

S2: drawing an energy band structure diagram and a PDOS diagram of the material, and drawing an energy difference diagram between CBs and VBs according to the energy band structure diagram of the material;

S3: determining spatial positions of CPs and the corresponding CBs and the VBs according to the CP analysis result diagram of the material and the energy difference diagram between the CBs and the VBs; and S4: indicating the CBs and the VBs in the energy band structure diagram, and determining the particle types participating in formation of the CPs in the PDOS diagram according to the energy band structure diagram with the indicated CBs and VBs, so as to complete the material optical transition analysis.

Preferably, the step S3 of determining the spatial positions of the CPs and the corresponding CBs and the VBs includes following steps:

horizontally drawing the obtained material CP analysis result diagram and the energy difference diagram between the CBs and the VBs side by side, such that energy ranges and scales of longitudinal coordinates of the two diagrams are completely consistent and aligned;

using a series of horizontal lines to indicate positions of the CPs in the CP analysis result diagram, making the horizontal lines to traverse into the energy difference diagram, and determining the CBs and the VBs participating in the formation of the CPs according to tangent points of the horizontal lines and the energy difference curves; and determining the spatial positions of the CPs by indicating the above-mentioned tangent points in the Brillouin zone (BZ).

Preferably, the step S4 of indicating the CBs and the VBs in the energy band structure diagram includes:

drawing the energy band structure diagram of the step S2 right above the energy difference diagram to make it consistent with the high symmetry points of the BZ covered by horizontal coordinates of the energy difference diagram, where scales of the high symmetry points in the two diagrams are aligned with each other; and drawing a straight line perpendicular to the upper energy band structure diagram from the tangent points on the curves of the energy difference diagram, wherein two points where the straight line intersects with the energy band structure diagram indicate the CBs and the VBs participating in formation of the CPs, so as to indicate the CBs and the VBs in the energy band structure diagram.

Preferably, the step S4 of determining the type of the particles participating in formation of the CPs includes:

drawing the PDOS diagram at one side of the energy band structure diagram, so that the energy ranges of the longitudinal coordinates thereof and the longitudinal coordinates of the band structure diagram are consistent, and the scales of the two longitudinal coordinates are aligned; and drawing straight lines horizontally from the CBs and the VBs indicated in the energy band structure diagram and extending the same to the PDOS diagram, and directly reading out the type of the particles participating in the formation of the CPs in the PDOS diagram by analyzing intersections of the straight lines with spectral lines in the PDOS diagram.

According to another aspect, the invention provides a material optical transition analysis system including:

a CP analysis module, configured to determine a dielectric function spectrum of a material to be analyzed, and calculate a second derivative spectrum of the dielectric function spectrum with respect to excitation light energy, and perform CP analysis on the second derivative spectrum to obtain a CP analysis result diagram of the material;

an energy difference calculation module, configured to draw an energy band structure diagram and a PDOS diagram of the material, and draw an energy difference diagram between CBs and VBs according to the energy band structure diagram of the material;

an energy level and position determination module, configured to determine spatial positions of CPs and the corresponding CBs and the VBs according to the CP analysis result diagram of the material and the energy difference diagram between the CBs and the VBs; and a particle type determination module, configured to indicate the CBs and the VBs in the energy band structure diagram, and determine particle types participating in the formation of the CPs in the PDOS diagram according to the energy band structure diagram with the indicated CBs and VBs, so as to complete the material optical transition analysis.

Preferably, the energy level and position determination module adopts following steps to determine the spatial positions of the CPs and the corresponding CBs and the VBs:

horizontally drawing the obtained CP analysis result diagram of the material and the energy difference diagram between the CBs and the VBs side by side, such that energy ranges and scales of longitudinal coordinates of the two diagrams are completely consistent and aligned;

using a series of horizontal lines to indicate the positions of CPs in the CP analysis result diagram, making the horizontal lines to traverse into the energy difference diagram, and determining the CBs and the VBs participating in the formation of the CPs according to tangent points of the horizontal lines and curves in the energy difference diagram; and determining the spatial positions of the CPs by indicating the above-mentioned tangent points in the BZ.

Preferably, the particle type determination module adopts following steps to indicate the CBs and the VBs in the energy band structure diagram:

drawing the energy band structure diagram of the step S2 right above the energy difference diagram to make it consistent with the high symmetry points of the BZ covered by horizontal coordinates of the energy difference diagram, where scales of the high symmetry points in the two diagrams are aligned with each other; and drawing a straight line perpendicular to the upper energy band structure diagram from the tangent points on the curves of the energy difference diagram, wherein two points where the straight line intersects with the energy band structure diagram indicate the CBs and the VBs participating in formation of the CPs, so as to indicate the CBs and the VBs in the energy band structure diagram.

Preferably, the particle type determination module adopts following steps to determine the type of the particles participating in formation of the CPs:

drawing the PDOS diagram at one side of the energy band structure diagram, so that the energy ranges of the longitudinal coordinates thereof and the longitudinal coordinates of the band structure diagram are consistent, and the scales of the two longitudinal coordinates are aligned; and drawing straight lines horizontally from the CBs and the VBs indicated in the energy band structure diagram and extending the same to the PDOS diagram, and directly reading out the type of the particles participating in the formation of the CPs in the PDOS diagram by analyzing intersections of the straight lines with spectral lines in the PDOS diagram.

In overall, compared with the prior art, the above technical scheme conceived by the invention has following technical advantages:

1. The invention utilizes a CP analysis to perform fitting analysis on the second derivative spectrum of the material dielectric function to obtain specific information of the material CPs, and combined with the energy band structure diagram, the PDOS diagram and the energy difference diagram to accurately identify the energy levels and particle type associated with the formation of the material CPs, the system of the invention has comprehensive and specific theoretical support, and is suitable for in-depth analysis of optical transition characteristics of various materials, and has broad application prospects.

2. By synthetically utilizing information of the CP analysis result, the energy band structure diagram, the PDOS diagram and the energy difference diagram, the optical transition mechanism of the material is revealed, and the spatial position, the particle type and the involved energy band of the material optical transition can be determined systematically and comprehensively, which realizes organic combination of theory and experiment results, and effectively solves the problem of inaccurate and incomplete analysis results of the existing analytical method.

3. The invention also provides the concrete operation steps and means of how to determine the spatial positions of the CPs, the corresponding CB and VB, and the type of the particles involving in the formation of the CPs by using the CP analysis result diagram, the energy band structure diagram, the PDOS diagram and the energy difference diagram, which has guiding significance for practical operations and applications.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. It should be understood that the specific embodiments described herein are merely used for explaining the invention and are not intended to be limiting of the invention. Furthermore, the technical features involved in the various embodiments of the invention described below may be combined with each other as long as they do not conflict with each other.

A basic principle of the invention is as follows. A CP analysis is performed on a second derivative spectrum of a dielectric function of a material to obtain center energy information thereof; and then an energy band structure and a PDOS of the material are obtained through, for example, a first-principles calculation, and a difference processing is performed to a CB and a VB in the energy band structure diagram of the material to draw an energy difference curve of the CB and the VB; finally, a CP analysis result, the energy difference curve of the CB and the VB, an energy band structure diagram, a PDOS diagram are sequentially drawn, so as to accurately identify an energy level and particle types related to the formation of the CP in the dielectric function spectrum of the material with assistance of an energy band nesting theory, and determine a formation position of the CP in the BZ. The method realizes analysis and interpretation of the optical transition characteristics of a materials from the perspective of physics, which has a more solid theoretical basis, a clear operation process, and accurate and reliable analysis results, and it is suitable for in-depth analysis and understanding of optical transitions of various materials.

Figure 1:
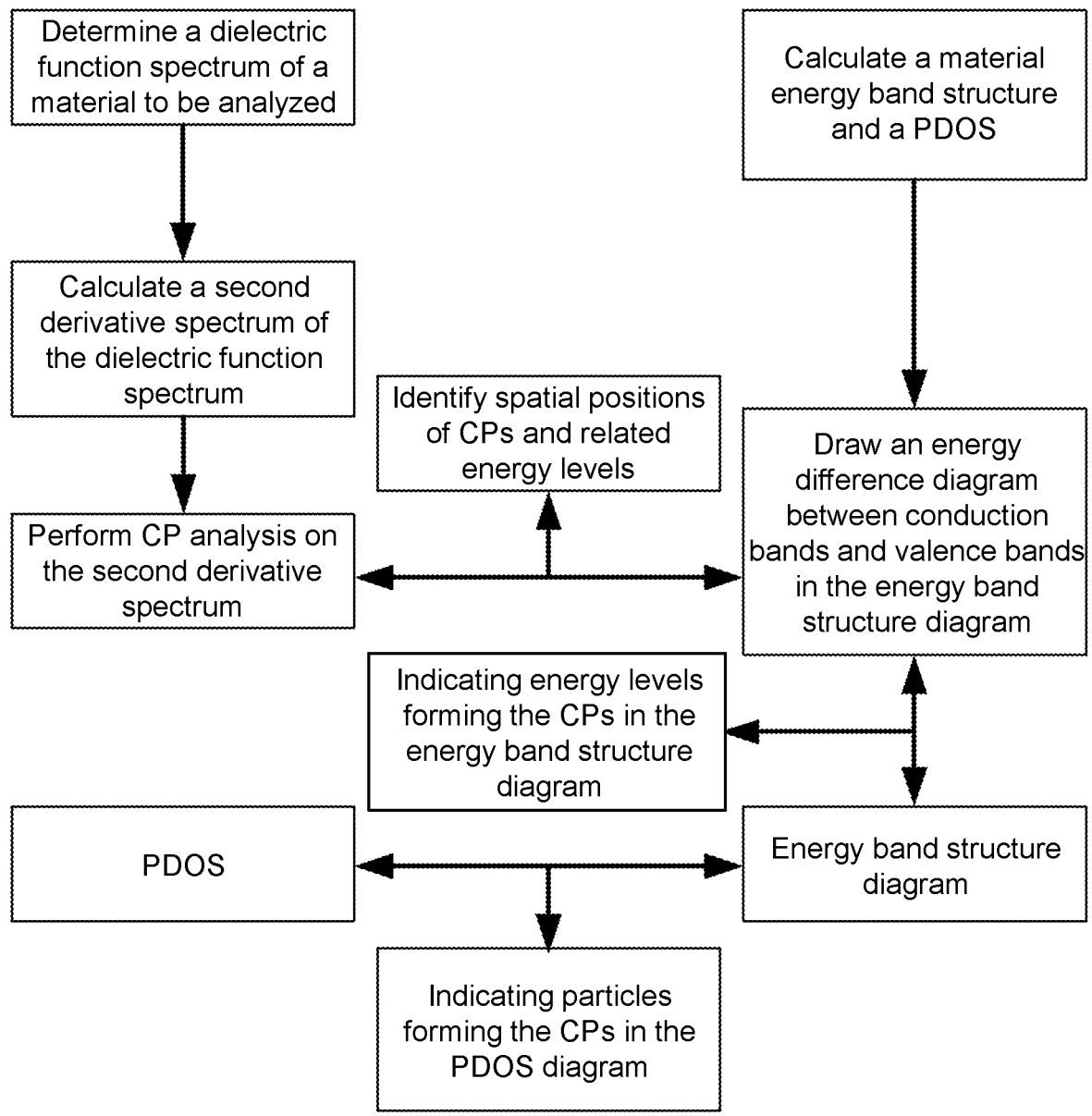
FIG. 1 is a flowchart illustrating a material optical transition analysis method according to an embodiment of the invention.

As shown in FIG. 1, an embodiment of the invention provides a material optical transition analysis method, which is adapted to analyze and interpret the optical transition characteristics of the material at the physical level, and for any material, the method includes the following steps:

S1: obtaining a dielectric function spectrum ε(E) of a material to be analyzed over a specified band according to an actual requirement, which may be obtained by means of experimental measurements and literature (database) consulting, etc.; calculating a second derivative spectrum of the dielectric function spectrum ε(E) with respect to excitation light energy E: $d^2\varepsilon(E)/dE^2$; the CPs of the material are the positions where the optical transitions occur, so that a CP fitting analysis is performed on the obtained second derivative spectrum of the dielectric function to obtain detailed parameter information of CPs in the dielectric function spectrum and a CP analysis result diagram, where a detailed fitting equation is:

$$d^2\varepsilon(E)/dE^2 = \begin{cases} m(m-1)Amp \cdot \exp(i\phi)(E - E_0 + i\Gamma)^{m-2} & (m \neq 0) \\ Amp \cdot \exp(i\phi)(E - E_0 + i\Gamma)^{-2} & (m = 0) \end{cases} \quad (1)$$

Where, Amp, $\phi$, $E_0$ and $\Gamma$ are respectively the amplitude, the phase, the center energy and the damping coefficient of the CP, i is the imaginary unit, m represents the wave vector ($K=(k_x, k_y, k_z)$) dimension of the optical transition involved at the CP, and when m=½, 0, -½, it represents that the wave vector dimension is respectively 1, 2 and 3; and when m=−1, it represents that the exciton behaviour is presented at the CP; a specific selection of the m value can be obtained by consulting a literature.

S2: calculating a material energy band structure and a PDOS (Partial Density of States):

obtaining the material energy band structure and the PDOS through the first-principles calculations, and then drawing an energy band structure diagram and a PDOS diagram of the material; and drawing an energy difference diagram (i.e. a ΔE(k) diagram) between the CBs and the VBs in the energy band structure diagram of the material. To be specific, the energy difference is calculated through an equation $\Delta E_{ij}(k)=E_{CB}^i(k)-E_{VB}^j(k)$ according to the obtained energy band structure diagram, and then the energy difference diagram between the CBs and the VBs is drawn, where $E_{CB}^j(k)$ represents the $i^{th}$ CB, $E_{VB}^j(k)$ represents the $j^{th}$ VB;

S3: determining the CB and the VB participating in formation of the CP and a spatial position of the CP:

horizontally drawing the CP analysis result diagram obtained in the step S1 and the ΔE(k) diagram obtained in the step S2 side by side, such that energy ranges and scales of longitudinal coordinates of the two diagrams are completely consistent and aligned;

using a series of horizontal dotted lines to indicate positions of the CPs in the CP analysis result diagram, and making the horizontal dotted lines to horizontally traverse into the ΔE(k) diagram;

determining the CBs and the VBs participating in the formation of the CPs by analyzing the tangent situation between the horizontal dotted lines and the curves in the ΔE(k) diagram;

determining the spatial positions of the CPs by indicating the above-mentioned tangent points in the BZ.

The above two points are mainly based on an energy band nesting theory, and a detailed equation thereof is:

$$JDOS(\Delta E) = \frac{1}{4\pi^3} \int \frac{dS_k}{|\nabla_k E_{CB} - \nabla_k E_{VB}|} = \frac{1}{4\pi^3} \int \frac{dS_k}{|\nabla_k \Delta E|}. \quad (2)$$

Where, JDOS is joint density of states, which almost determines a transition strength of carriers in the material, $S_k$ is the constant surface energy, which can be defined by ΔE. When $|\nabla_k \Delta E(k)|=0$, the JDOS can have a singular value, and it is most likely to form a carrier transition. The following two situations can lead to the singular JDOS, one situation is $\nabla_k E_{CB} \approx \nabla_k E_{VB} \approx 0$, and such situation generally occurs at high symmetry points of the BZ, at these positions, changing rates of the CB and VB curves of the material in a certain spatial direction are zero at the same time to finally form the singular JDOS; another situation is $\nabla_k E_{CB} \approx \nabla_k E_{VB} \neq 0$, and now the changing rates of the CB and VB curves of the material in a certain spatial direction are almost the same and none zero, which results in $\nabla_k E_{CB} - \nabla_k E_{VB} \approx 0$, so as to make the JDOS singular. The second unique energy band phenomenon is particularly prominent in low-dimensional materials, which is generally referred to as energy band nesting, where the CB and the VB in the energy band structure are almost parallel to each other. Both of the above two situations are covered by the point where the spatial variation rate of the energy difference curve ΔE(k) of the CB and the VB is zero. Therefore, tangents of the curves in ΔE(k) and the horizontal dotted lines indicating the center energy of the CPs are most likely to be positions at which these CPs are formed, and then by observing and analyzing which CB and VB are used to obtain the curve tangent to the horizontal dotted lines through the difference calculation, the CB and VB related to the formation of the CPs can be determined.

S4: indicating the CBs and the VBs in the material energy band structure diagram participating in formation of each of the CPs, and determining a type of particles participating in formation of the CPs in the material PDOS diagram:

indicating energy bands participating in the formation of the CPs in the energy band structure diagram based on the CBs and VBs identified in the step S3, to be specific, drawing the energy band structure diagram obtained in the step S2 right above the ΔE(k) diagram to make it consistent with the high symmetry points of the BZ covered by horizontal coordinates of the ΔE(k) diagram, where scales of the high symmetry points in the two diagrams are aligned with each other horizontally; and drawing a series of vertical dotted line from the tangent point determined in the step S3 to intersect with corresponding energy levels in the above energy band structure diagram, so as to indicate the CBs and the VBs participating in the formation of each of the CPs in the energy band structure diagram.

The step of determining the type of the particles participating in the formation of the CPs in the material PDOS diagram includes: in case that the energy levels participating in the formation of the CPs have been determined, the PDOS diagram can be introduced to further determine the type of the particles participating in the formation of the CPs (orbits where electrons are located, atoms that provide the electrons, etc.) and qualitatively analyze a participation proportion of each particle. To be specific, drawing the PDOS diagram to the right of the energy band structure diagram to ensure consistence of longitudinal coordinates thereof with longitudinal coordinates of the energy band structure diagram, and alignment of scales of the two diagrams; drawing a series of horizontal dotted lines from the energy levels of each of the CPs to extend into the PDOS diagram, so as to read out the type of the particles participating in formation of each CP from the PDOS diagram and analyze a participation degree thereof.

Figure 2:
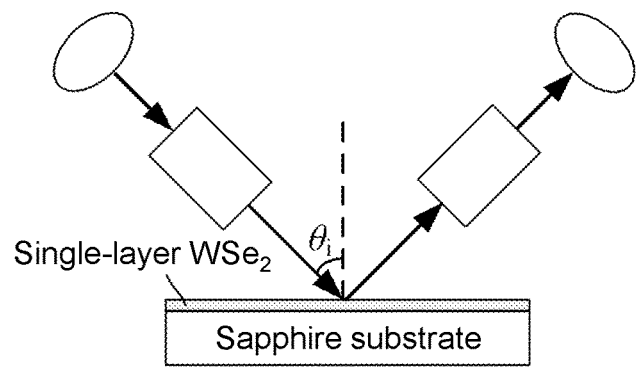
FIG. 2 is a schematic diagram of ellipsometric measurement of a single-layer $WSe_2$ on a sapphire substrate according to an embodiment of the invention.
Figure 3:
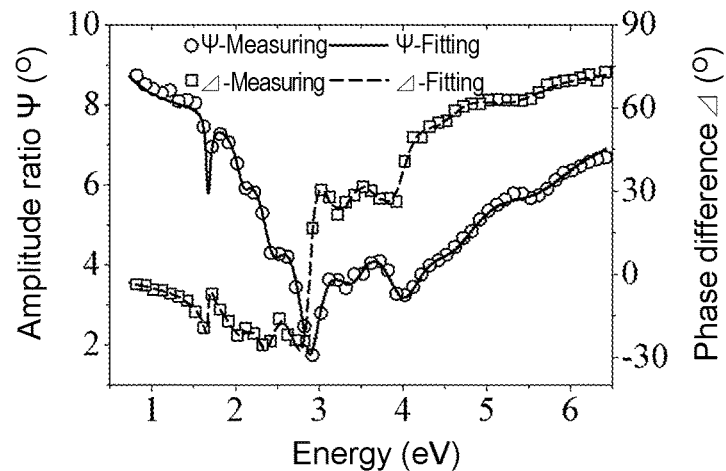
FIG. 3 is a measurement and fitting ellipsometric spectrum of the single-layer $WSe_2$ in an energy range of 0.73-6.42 eV according to an embodiment of the invention.
Figure 4:
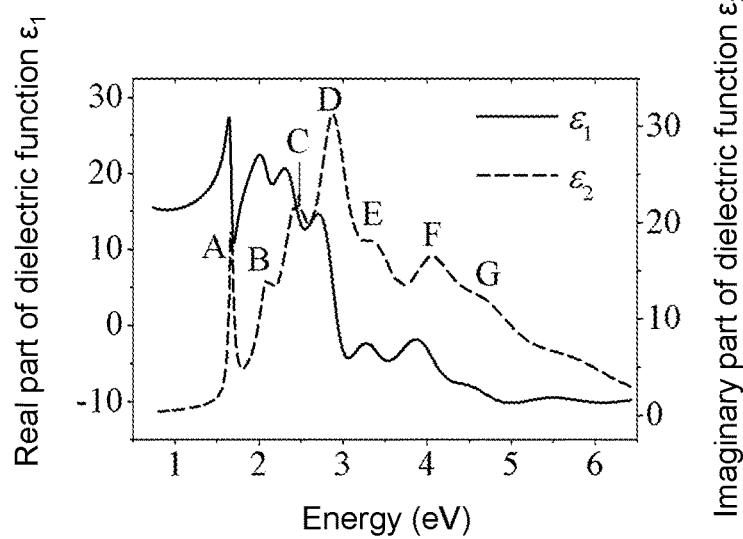
FIG. 4 is a dielectric function spectrum of the single-layer $WSe_2$ over the energy range of 0.73-6.42 eV according to an embodiment of the invention.

An embodiment is provided below, and in the embodiment, a spectroscopic ellipsometer is adopted to measure an ellipsometric spectrum of a single-layer $WSe_2$ on a sapphire substrate (referring to FIG. 2), and a dielectric function spectrum of $WSe_2$ is obtained through analysis. Then, physical causes of optical transitions in the single-layer $WSe_2$ are deeply discussed by using CP analysis, first-principles calculations and energy band nesting theory, and detailed implementation steps are as follows:

(1) determining the dielectric function spectrum of a specified band of the single-layer $WSe_2$:

the spectroscopic ellipsometer is adopted to measure an ellipsometric parameter spectrum [Ψ, Δ] of the single-layer $WSe_2$, where tan Ψ and Δ represent an amplitude ratio and a phase difference of p-polarized light and s-polarized light, the energy range of the ellipsometric measurement is 0.73-6.42 eV, the incident angle $\theta_i=65°$, and the obtained ellipsometric spectrum of the single-layer $WSe_2$ is drawn in FIG. 3. By fitting the ellipsometric spectrum of the single-layer $WSe_2$ with a combined oscillator dielectric function model (6Lorentz+2Cody-Lorentz), the dielectric function spectrum shown in FIG. 4 is obtained, where the dielectric function spectrum shows seven discernible CPs (A-G) (including the maximum points and the shoulder points).

(2) Solving a second derivative spectrum of the single-layer $WSe_2$ dielectric function spectrum data processing software OriginPro 9.1 is used to calculate the numerical second derivative of the single-layer $WSe_2$ dielectric function spectrum with respect to the excitation light energy.

(3) CP analysis (i.e. using the equation (1) to fit the second derivative spectrum of the dielectric function of the material to obtain the detailed information of each CP in the dielectric function spectrum, which includes the center energy $E_0$, the damping coefficient Γ, the amplitude Amp, and the phase ϕ.)

CP analysis is performed to the second derivative spectrum of the single-layer $WSe_2$ dielectric function spectrum. By referring to the existing literatures, the parameter m of the equation (1) can be set to −1, which can describe the exciton transitions occurred at the CPs. Considering that an amplitude of the second derivative spectrum in a low-energy band is much larger than that in a high-energy band, the spectral characteristics of the high-energy band are easily neglected if the whole spectrum is subjected to a uniform CP fitting analysis. Therefore, the CP analysis is performed to the second derivative spectrum in two energy bands, which are respectively a low-energy band (1.50-2.20 eV) and a high-energy band (2.20-6.42 eV), and there is no obvious CP in the dielectric function spectrum of the energy band lower than 1.50 eV, which is not analyzed. Finally, the center energies of 7 CPs are respectively 1.67 eV, 2.09 eV, 2.42 eV, 2.89 eV, 3.39 eV, 4.01 eV, 4.66 eV, and CP fitting analysis result is plotted in FIG. 5.

Figure 6:
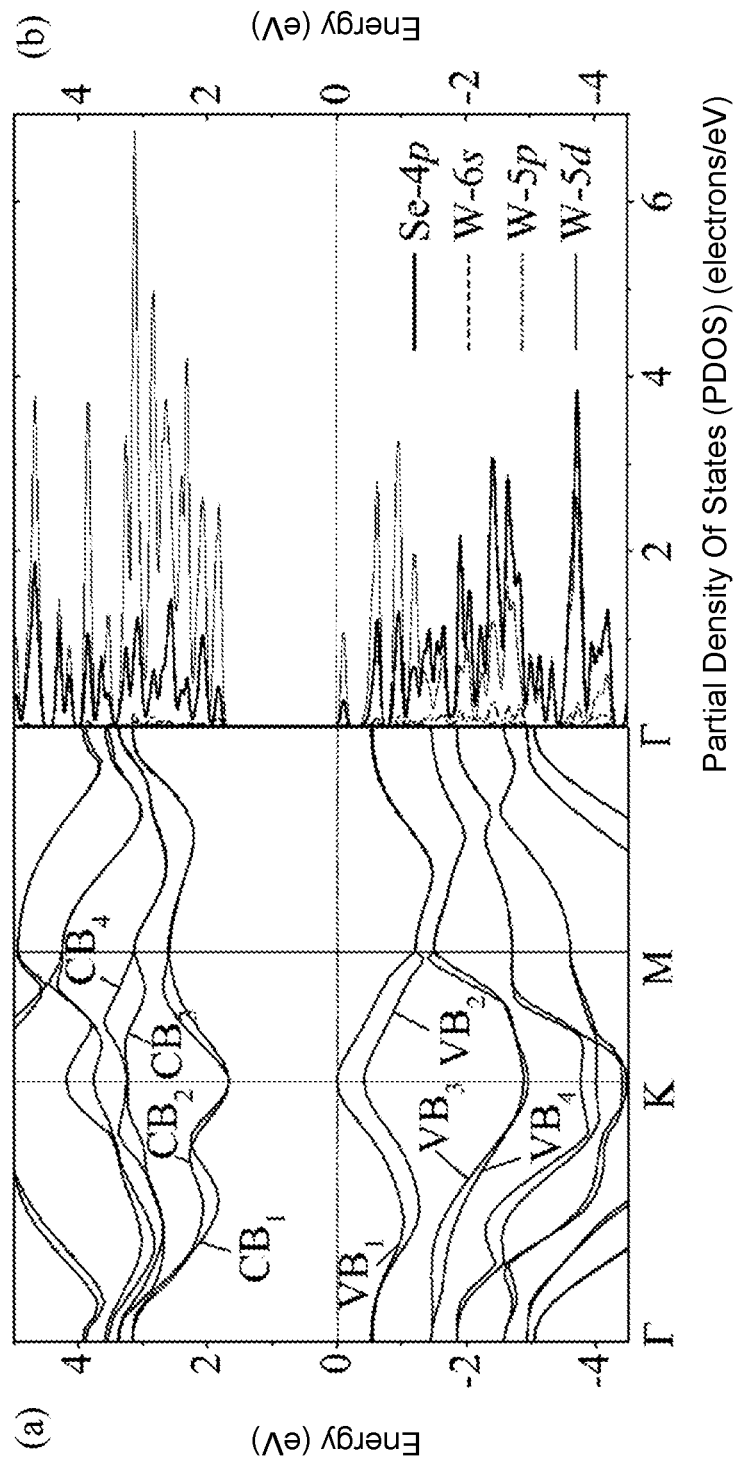
FIG. 6 is an energy band structure diagram and a PDOS diagram of the single-layer $WSe_2$ obtained from the first-principles calculations according to an embodiment of the present invention, in which (a) is the energy band structure diagram of the single-layer $WSe_2$, and (b) is the PDOS diagram of the single-layer $WSe_2$.

(4) Calculating and drawing an energy band structure diagram and a PDOS diagram of the single-layer $WSe_2$ the energy band structure and the PDOS of the single-layer $WSe_2$ are calculated by the first-principles software package Vienna ab initio package (VASP v5.4.1) based on the density functional theory (DFT), the most stable 2H crystal configuration of the $WSe_2$ is adopted in this calculations, and the single-layer $WSe_2$ has 15 Å vacuum layers on top and bottom to minimize the influence of interlayer interaction on final calculation results as far as possible. The Perdew-Burke-Ernzerhof (PBE) functional based on the plane wave (PAW) pseudopotential is adopted to optimize the crystal configuration, and the force and total energy convergence criteria during the optimization process are 0.01 eV/A and $10^{-5}$ eV, respectively. The calculation of the energy band structure and the PDOS is accomplished by using the PAW-based hybrid functional Heyd-Scuseria-Ernzerhof (HSE06), where a kinetic energy cut-off energy in the calculation is set to 700 eV, the BZ grid is divided into 8×8×1, and the integration path is: Γ-K-M-Γ. In order to accurately simulate the energy band splitting phenomenon caused by the strong spin-orbit coupling (SOC) in the single-layer $WSe_2$, the SOC effect is taken into account in the calculations, the calculated energy band structure and the PDOS of the single-layer $WSe_2$ are drawn in FIG. 6.

Figure 7:
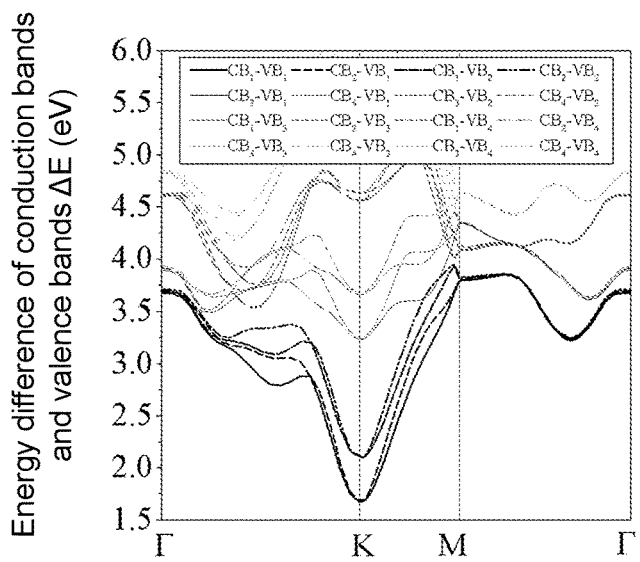
FIG. 7 is a spatial distribution diagram of energy differences of CBs and VBs of the single-layer $WSe_2$ according to an embodiment of the invention.

(5) drawing an energy difference diagram between the CBs and VBs of the single-layer $WSe_2$ Considering a center energy range of the CPs of the single-layer $WSe_2$, only the differences between the first four levels of CBs and the first four levels of VBs in the energy band structure are calculated to obtain 16 energy difference curves $\Delta E_{ij}(k)$ (i=1, 2, 3, 4; j=1, 2, 3, 4) as shown in FIG. 7. A reason of selecting the first four levels of the CBs and the VBs is that when the first four levels of the CBs and the VBs are selected, all the corresponding $\Delta E_{ij}(k)$ values in the BZ have exceeded the center energy value of the CP G, and it is meaningless to use the higher CBs and VBs for the difference processing. Therefore, when the values of $\Delta E_{ij}(k)$ in the BZ have all been greater than the center energy of the CP with the highest energy, the difference processing can be stopped.

Figure 5:
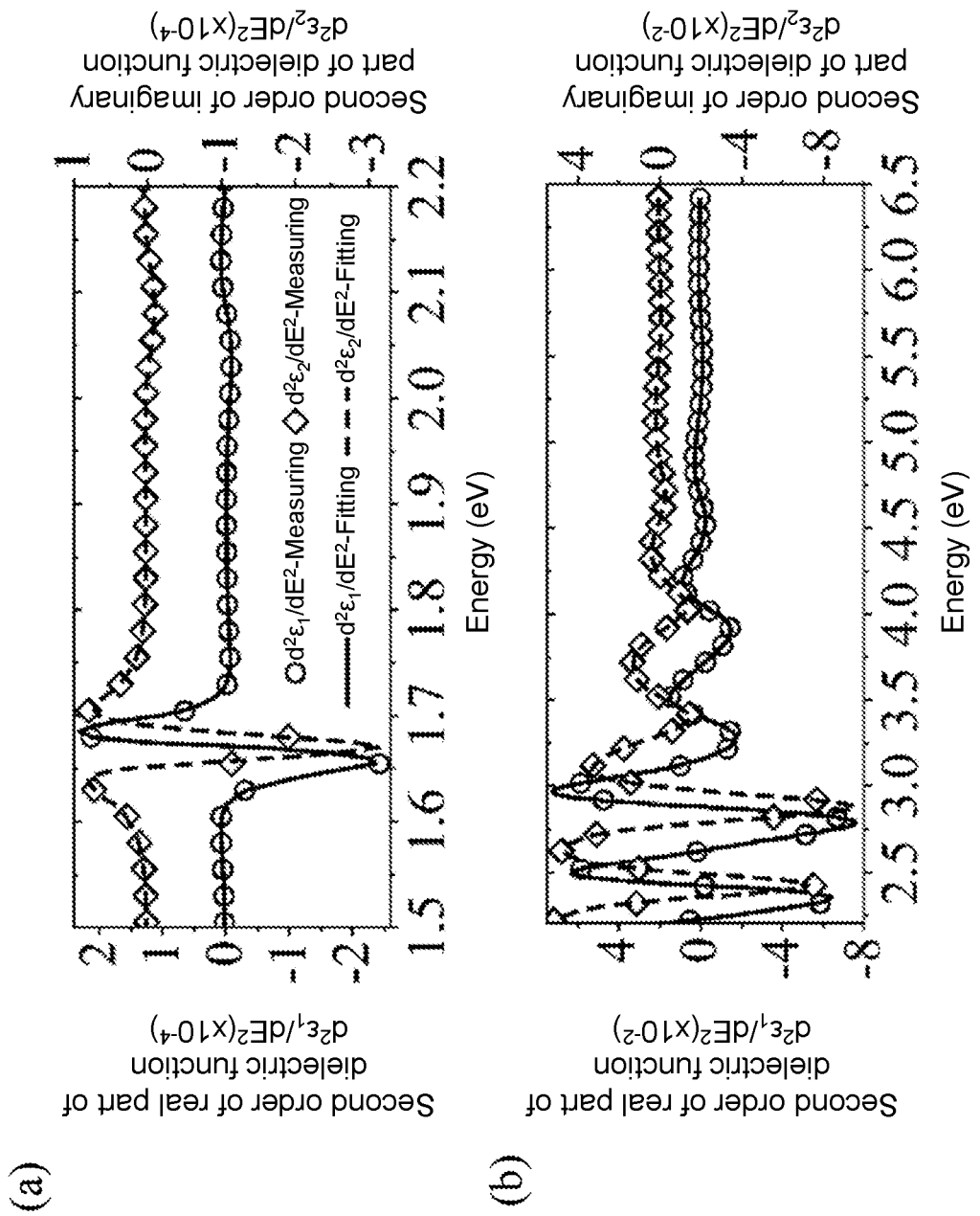
FIG. 5 is a CP analysis result of the single-layer $WSe_2$ according to an embodiment of the invention, in which (a) is an analysis result of a low-energy band CP, (b) is an analysis result of a high-energy band CP.
Figure 8:
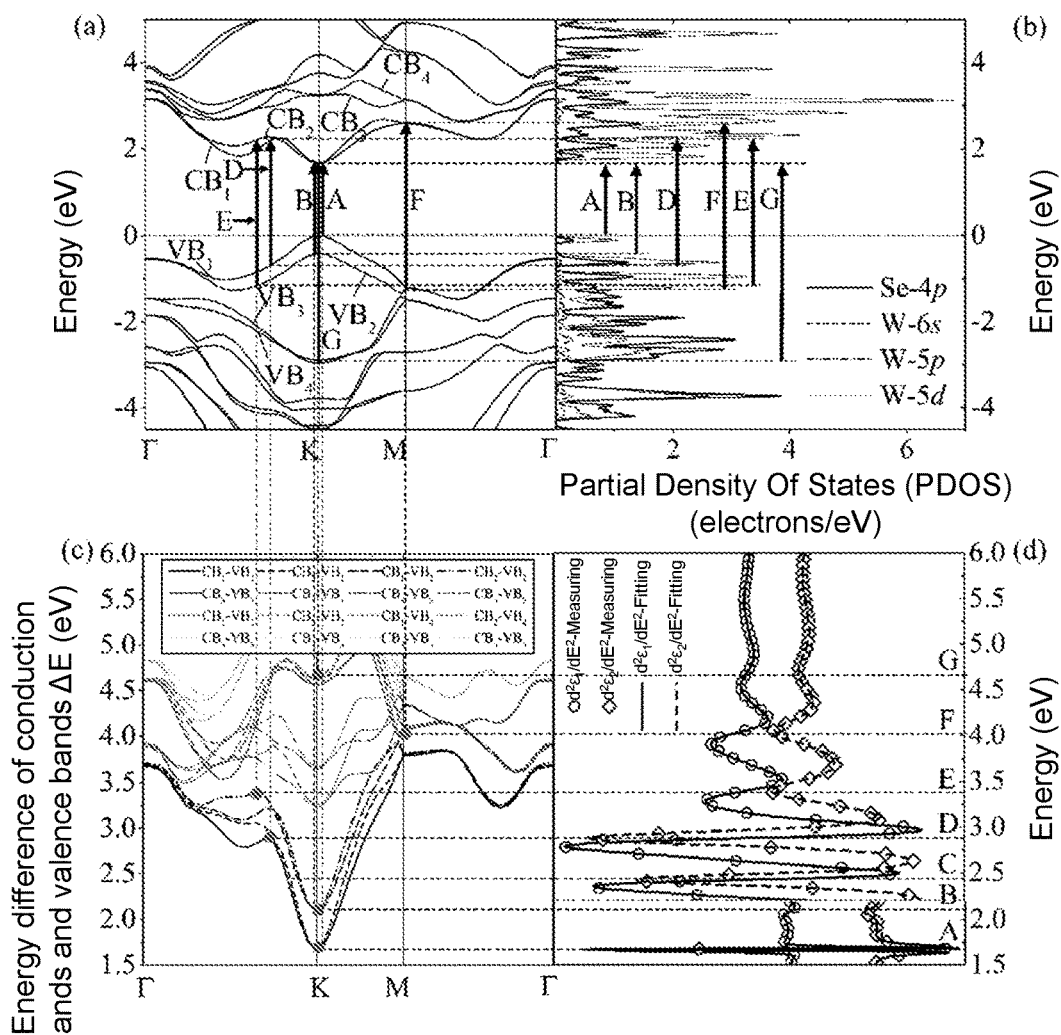
FIG. 8 is a diagram showing spatial positions of CPs, related energy band, and a related particle type in a single-layer $WSe_2$ dielectric function spectrum according to an embodiment of the invention, in which (a) is an energy band structure diagram of the single-layer $WSe_2$, (b) is a PDOS diagram of the single-layer $WSe_2$, (c) is an energy difference spatial distribution diagram of the CBs and VBs of the single-layer $WSe_2$, (d) is a CP analysis result of the single-layer $WSe_2$ dielectric function spectrum.

(6) Determining the CBs and VBs related to the formation of the CPs in the $WSe_2$ dielectric function spectrum and forming positions of the CPs in the BZ:

two result diagrams obtained through high-energy and low-energy CP analysis in FIG. 5 are spliced into one (FIG. 8(d)), and the energy is taken as the longitudinal axis, the $\Delta E_{ij}(k)$ diagram obtained in the step (5) is drawn to the left of the CP analysis result to ensure consistence of energy intervals of longitudinal coordinates of the two diagrams (which are all 1.5-6.0 eV) and vertical alignment of scales; a series of horizontal dotted lines are used to indicate center energy positions of the above 7 CPs in the CP analysis diagram and are connected to the $\Delta E_{ij}(k)$ diagram, and tangent points of the horizontal dotted lines and curves in the $\Delta E_{ij}(k)$ diagram indicate the positions of the CPs. By analyzing which CBs and VBs are used to obtain the curves tangent to the horizontal dotted lines through the difference calculation, the energy levels participating in the formation of the CPs may be deduced reversely. To be specific, as shown in FIG. 8(c,d), both of CP A and CP B in the single-layer $WSe_2$ dielectric function spectrum are formed at the high symmetry point K in the BZ, and the CBs participating in formation of the CP A and the CP B are $CB_{1-2}$, and the VB associated with the CP A is $VB_1$, and the VB associated with the CP B is $VB_2$. Since the curve tangent to the dotted line passing through the center energy of the CP C does not appear in FIG. 8(c), the energy levels participating in the formation of the CP C cannot be specifically determined, and energy band projection calculation is required for further judgment. CPs D and E are all formed between F and K points of the BZ, which are related to energy band nesting, the formation of the CP D is related to transition of electrons from $VB_1$ to $CB_1$, and the formation of CP E is related to transition of electrons from $VB_2$ to $CB_2$. CP F is formed at a high symmetry point M of the BZ, and multiple transitions of electrons from $VB_{1-2}$ to $CB_{1-2}$ are its main cause. The high-energy CP G is formed at the high symmetry point K of the BZ, which is related to the multiple transitions of electrons from $VB_{3-4}$ to $CB_{1-2}$.

(7) indicating the CBs and VBs participating in the formation of the CPs in the energy band structure diagram of the single-layer $WSe_2$ in order to intuitively display the CBs and VBs related to the CP formation, the energy band structure diagram calculated in the step (4) is drawn right above the $\Delta E_{ij}(k)$ figure, and the high symmetric points of horizontal coordinates of the two diagrams are horizontally aligned; some vertical dotted lines are drawn from the tangent points determined in the step (6) (gray dots in FIG. 8(c)) to extend to the energy band structure diagram (FIG. 8(a)). According to the analysis result of the step (7), some upward arrows (arrow direction represents the main transition direction) are used to sequentially indicate the CBs and VBs participating in the formation of the CPs in FIG. 8(a).

(8) Determine the type of particles participating in the formation of each CP in the PDOS diagram of the single-layer $WSe_2$ in order to identify the particle types (orbits where electrons are located and atoms that provide the electrons) participating in the CP formation, the PDOS diagram calculated in the step (4) is drawn to the right of the energy band structure diagram, and the energy intervals of the longitudinal coordinates are ensured to be consistent (which are all −4.5-5 eV), and the scales are vertically aligned; some horizontal dotted lines are drawn from heads and tails of the arrows indicated in the step (7) to connect the energy band structure diagram and the PDOS diagram, so as to identify the particles related to the CP formation. To be specific, as shown in FIG. 8(b), the particles participating in the formation of the CPs in the single-layer $WSe_2$ dielectric function spectrum are mainly electrons of an Se 4p orbit and a W 5d orbit, where the electrons of the Se 4p orbit dominate the CPs A-F, and the electrons of the W 5d orbit only influence the VBs of the CP G.

In summary, the material optical transition analysis method of the invention utilizes a CP analysis theory to perform fitting analysis on the second derivative spectrum of the material dielectric function to obtain the CP analysis result diagram and specific parameter information of the material CPs, and combined with the energy band structure diagram, the PDOS diagram and the energy band nesting theory (i.e. the CBs and the VBs are determined by the tangents of the horizontal dotted lines passing through the CPs and the E(k) curves), so as to accurately identify the energy levels and particle types associated with the formation of the CPs, and by skillfully combining the CP analysis result of the dielectric function spectrum and the energy band structure/PDOS, in-deep analysis in a physical aspect of the optical transitions exhibited in the material dielectric function spectrum is performed. Compared with the existing optical transition analysis methods, the CP positions determined according to the method of the invention are more accurate, and the energy levels and particle types associated with the CP formation can be accurately located, the method is more comprehensive and has more solid theoretical support, which is suitable for in-depth analysis of the optical transition characteristics of various materials and has broad application prospects.

In the above specific analysis process, only the single-layer $WSe_2$ on the sapphire substrate is taken as an example for description, and the optical transition analysis of the other types of materials may also be operated according to the same method.

The method of the invention is not limited to the specific embodiments mentioned above, and general technicians of the field can implement the invention in a variety of other specific embodiments according to the contents disclosed by the invention, for example, to use other methods or instruments that can obtain the material dielectric function spectrum, other analytical bands, other software packages or codes that can calculate the material energy band structure and the PDOS, etc. Therefore, any design that adopts the principle and idea of the design method of the invention and makes some simple changes or modifications falls into a protection scope of the invention.

What is claimed is:

1. A material optical transition analysis method, comprising:
    S1: determining a dielectric function spectrum of a material to be analyzed, calculating a second derivative spectrum of the dielectric function spectrum with respect to excitation light energy, and performing critical point (CP) fitting analysis on the second derivative spectrum to obtain a CP analysis result diagram of the material;
    S2: drawing an energy band structure diagram and a Partial Density of States (PDOS) diagram of the material, and drawing an energy difference diagram between conduction bands (CBs) and valence bands (VBs) according to the energy band structure diagram of the material;
    S3: determining spatial positions of CPs and the corresponding CBs and the VBs according to the CP analysis result diagram of the material and the energy difference diagram between the CBs and the VBs; and
    S4: indicating the CBs and the VBs in the energy band structure diagram, and determining the particle types participating in formation of the CPs in the PDOS diagram according to the energy band structure diagram with the indicated CBs and VBs, so as to complete the material optical transition analysis,
    wherein the step S4 of determining the type of the particles participating in formation of the CPs comprises:
    drawing the PDOS diagram at one side of the energy band structure diagram, so that the energy ranges of the longitudinal coordinates thereof and the longitudinal coordinates of the band structure diagram are consistent, and the scales of the two longitudinal coordinates are aligned; and
    drawing straight lines horizontally from the CBs and the VBs indicated in the energy band structure diagram and extending the same to the PDOS diagram, and directly reading out the type of the particles participating in the formation of the CPs in the PDOS diagram by analyzing intersections of the straight lines with spectral lines in the PDOS diagram.

2. The material optical transition analysis method as claimed in claim 1, wherein the step S3 of determining the spatial positions of the CPs and the corresponding CBs and the VBs comprises:
    horizontally drawing the obtained material CP analysis result diagram and the energy difference diagram between the CBs and the VBs side by side, such that energy ranges and scales of longitudinal coordinates of the two diagrams are completely consistent and aligned;
    using a series of horizontal lines to indicate positions of the CPs in the CP analysis result diagram, making the horizontal lines to horizontally traverse into the energy difference diagram, and determining the CBs and the VBs participating in the formation of the CPs according to tangent points of the horizontal lines and curves in the energy difference diagram; and determining the spatial positions of the CPs by indicating the above-mentioned tangent points in the Brillouin zone (BZ).

3. The material optical transition analysis method as claimed in claim 2, wherein the step S4 of indicating the CBs and the VBs in the energy band structure diagram comprises:

drawing the energy band structure diagram of the step S2 right above the energy difference diagram to make it consistent with the BZ high symmetry points covered by horizontal coordinates of the energy difference diagram, wherein scales of the high symmetry points in the two diagrams are aligned with each other; and drawing a straight line perpendicular to the upper energy band structure diagram from the tangent points on the curves of the energy difference diagram, wherein two points where the straight line intersects with the energy band structure diagram indicate the CBs and the VBs participating in formation of the CPs, so as to indicate the CBs and the VBs in the energy band structure diagram.

\* \* \* \* \*